(12) United States Patent
Nakadate

(10) Patent No.: US 6,302,248 B1
(45) Date of Patent: Oct. 16, 2001

(54) DAMPING FORCE CONTROL TYPE HYDRAULIC SHOCK ABSORBER

(75) Inventor: Takao Nakadate, Kanagawa-ken (JP)

(73) Assignee: Tokico Ltd., Kanagawa-ken (JP)

( * ) Notice: Subject to any disclaimer, the term of this patent is extended or adjusted under 35 U.S.C. 154(b) by 0 days.

(21) Appl. No.: 09/470,985

(22) Filed: Dec. 23, 1999

(30) Foreign Application Priority Data

Dec. 24, 1998 (JP) .................................................. 10-366657

(51) Int. Cl.[7] .............................. F16F 9/46; B60G 17/08
(52) U.S. Cl. .................................. 188/266.6; 188/322.13; 188/318
(58) Field of Search .............................. 188/313, 322.13, 188/322.15, 318, 266.6, 266.5, 280, 297, 266.1, 282.4, 282.2, 282.1, 282.3, 322.19, 322.2, 317; 280/5.5, 5.515; 137/493.8; 701/38

(56) References Cited

U.S. PATENT DOCUMENTS

| | | | |
|---|---|---|---|
| 4,880,086 | * 11/1989 | Knecht et al. | . |
| 5,655,633 | * 8/1997 | Nakadate et al. | 188/322.13 |
| 5,934,421 | * 8/1999 | Nakadate et al. | 188/318 |
| 5,996,748 | * 12/1999 | Nezu et al. | 188/266.5 |
| 6,079,526 | * 6/2000 | Nezu et al. | 188/266.6 |
| 6,119,829 | * 9/2000 | Nakadate | 188/266.6 |
| 6,155,391 | * 12/2000 | Kashiwagi et al. | 188/266.6 |
| 6,182,805 | * 2/2001 | Kashiwagi et al. | 188/266.6 |

* cited by examiner

*Primary Examiner*—Douglas C. Butler
(74) *Attorney, Agent, or Firm*—Wenderoth, Lind & Ponack, L.L.P.

(57) ABSTRACT

The flow of a hydraulic fluid between connecting ports caused by sliding movement of a piston in a cylinder is controlled by a fixed orifice and the flow path area determined by ports that is varied by a spool, thereby directly controlling orifice characteristics. At the same time, the pressure in a pilot chamber is changed by the pressure loss between the ports to change the valve opening pressure of a main valve, thereby controlling valve characteristics. An orifice passage is provided in parallel to the ports. Thus, when the flow path area determined by the ports is restricted, variations in the flow path area attributable to machining accuracy or the like can be absorbed by the flow path area of the orifice passage provided in parallel to the ports. Therefore, stable "hard" damping force characteristics can be obtained.

6 Claims, 3 Drawing Sheets

DAMPING FORCE CONTROL TYPE HYDRAULIC SHOCK ABSORBER

BACKGROUND OF THE INVENTION

The present invention relates to a damping force control type hydraulic shock absorber attached to a suspension system of a vehicle, for example, an automobile.

Hydraulic shock absorbers attached to suspension systems of automobiles or other vehicles include damping force control type hydraulic shock absorbers which are designed so that the level of damping force can be appropriately controlled in accordance with the road surface conditions, vehicle running conditions, etc. with a view to improving the ride quality and the steering stability.

In general, this type of hydraulic shock absorber includes a cylinder having a hydraulic fluid sealed therein. A piston, which has a piston rod connected thereto to constitute a piston assembly, is slidably fitted in the cylinder to divide the inside of the cylinder into two chambers. The piston assembly is provided with a main hydraulic fluid passage and a bypass passage, which provide communication between the two chambers in the cylinder. The main hydraulic fluid passage is provided with a damping force generating mechanism including an orifice and a disk valve. The bypass passage is provided with a damping force control valve for controlling the flow path area of the bypass passage.

When the bypass passage is opened through the damping force control valve, the flow resistance to the hydraulic fluid flowing between the two chambers in the cylinder is reduced, thereby reducing damping force. When the bypass passage is closed, the flow resistance between the two chambers is increased, thereby increasing damping force. Thus, damping force characteristics can be appropriately controlled by opening and closing the damping force control valve.

In the above-described damping force control type hydraulic shock absorber, in which damping force is controlled by changing the flow path area of the bypass passage, the damping force characteristics can be changed to a considerable extent in the low piston speed region because damping force depends on the restriction by the orifice in the hydraulic fluid passage. However, the damping force characteristics cannot greatly be changed in the intermediate and high piston speed regions because in these regions damping force depends on the degree of opening of the damping force generating mechanism (disk valve, etc.) in the main hydraulic fluid passage.

To solve the above-described problem, Japanese Patent Application Unexamined Publication (KOKAI) No. 62-220728, for example, discloses a damping force control type hydraulic shock absorber in which a pressure chamber (pilot chamber) is formed at the back of a disk valve serving as a damping force generating mechanism in a main hydraulic fluid passage common to the extension and contraction sides, and the pressure chamber is communicated with a cylinder chamber on the upstream side of the disk valve through a fixed orifice and also communicated with a cylinder chamber on the downstream side of the disk valve through a variable orifice (flow control valve).

According to the above damping force control type hydraulic shock absorber, the flow path area of the passage between the two chambers in the cylinder is controlled by opening and closing the variable orifice. Moreover, the valve opening initial pressure of the disk valve can be varied by changing the pressure in the pressure chamber by the pressure loss in the variable orifice. Thus, it is possible to control orifice characteristics (in which damping force is approximately proportional to the square of the piston speed) and valve characteristics (in which damping force is approximately proportional to the piston speed), and hence possible to widen the control range for damping force characteristics.

However, the above-described conventional damping force control type hydraulic shock absorber suffers from the following problems.

In general, the above described conventional damping force control type hydraulic shock absorber uses a spool valve or the like as the variable orifice. In this regard, variations in size of the sleeve, spool, ports, etc. attributable to machining accuracy cause variations in flow path area of a small flow path formed when the damping force characteristics are controlled to the "hard" side, i.e. when the variable orifice is closed. For this reason, it is difficult to obtain stable "hard" damping force characteristics.

SUMMARY OF THE INVENTION

In view of the above-described circumstances, an object of the present invention is to provide a damping force control type hydraulic shock absorber capable of obtaining stable damping force characteristic at all times.

To attain the above-described object, the present invention provides a damping force control type hydraulic shock absorber including a cylinder having a hydraulic fluid sealed therein. A piston is slidably fitted in the cylinder. A piston rod is connected at one end thereof to the piston. The other end of the piston rod extends to the outside of the cylinder. A main hydraulic fluid passage passes the hydraulic fluid in response to sliding movement of the piston. A sub-hydraulic fluid passage is provided in parallel to the main hydraulic fluid passage. A pilot-type damping valve is provided in the main hydraulic fluid passage. A fixed orifice and a variable orifice are provided in the sub-hydraulic fluid passage. The pressure between the fixed orifice and the variable orifice in the sub-hydraulic fluid passage is used as a pilot pressure of the pilot-type damping valve. An orifice passage is provided in parallel to the variable orifice.

With the above-described arrangement, by controlling the degree of opening of the variable orifice, damping force generated before the pilot-type damping valve opens is directly controlled, and at the same time, the pilot pressure is changed to control the valve opening pressure of the pilot-type damping valve. When the flow path area of the variable orifice is restricted, the flow rate of the hydraulic fluid flowing through the sub-hydraulic fluid passage is substantially determined by the orifice passage and hence unlikely to be affected by variations in flow path area of the variable orifice.

DETAILED DESCRIPTION OF THE INVENTION

Embodiments of the present invention will be described below in detail with reference to the accompanying drawings.

A first embodiment will be described with reference to FIGS. 1 and 2.

Figure 1:
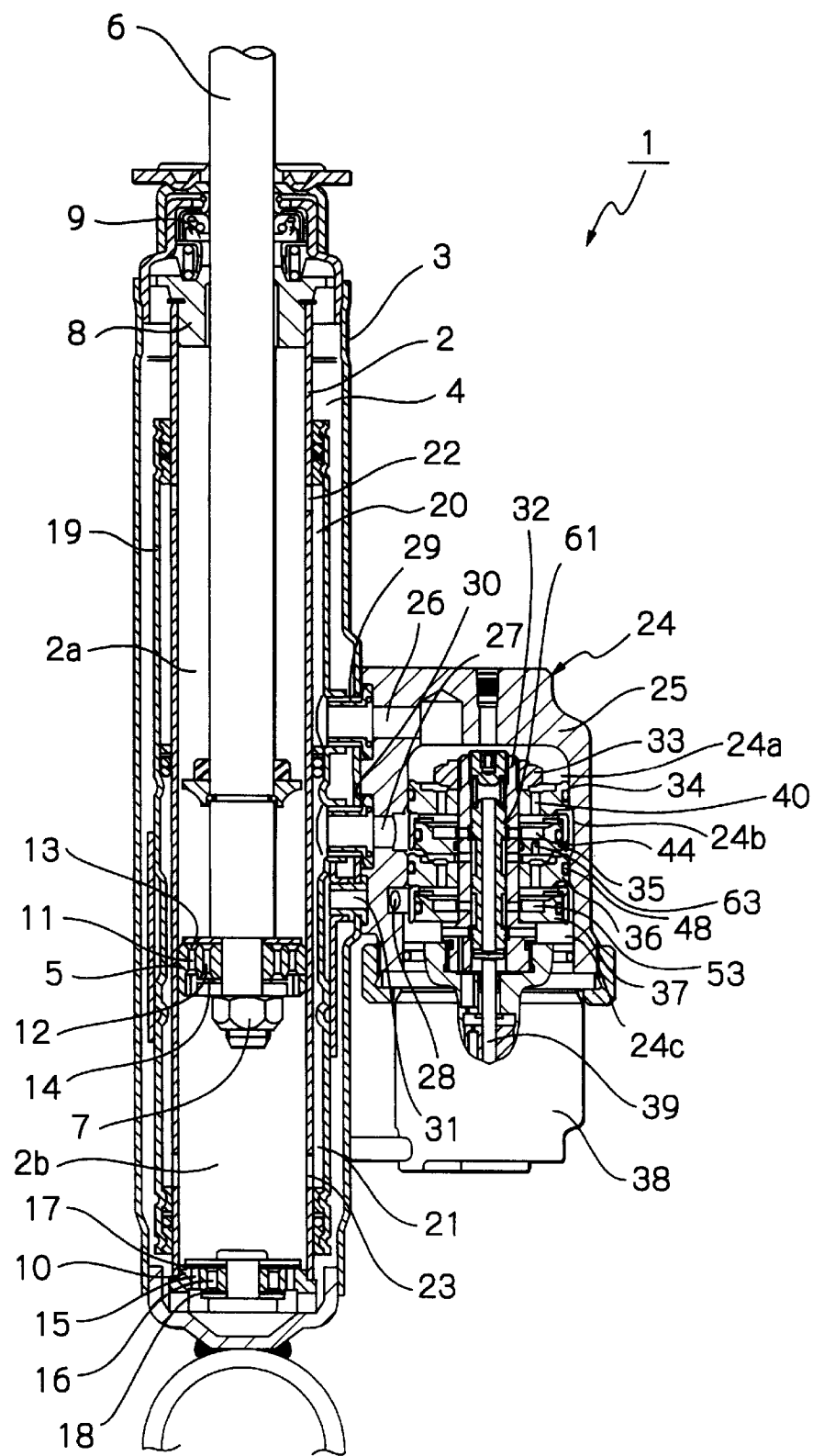
FIG. 1 is a vertical sectional view of a damping force control type hydraulic shock absorber according to a first embodiment of the present invention.

As shown in FIG. 1, a damping force control type hydraulic shock absorber 1 according to the first embodiment has a double-cylinder structure comprising a cylinder 2 and an outer cylinder 3 provided outside the cylinder 2. A reservoir 4 is formed between the cylinder 2 and the outer cylinder 3. A piston 5 is slidably fitted in the cylinder 2. The piston 5 divides the inside of the cylinder 2 into two chambers, i.e. a cylinder upper chamber 2a and a cylinder lower chamber 2b. The piston 5 is connected with one end of a piston rod 6 by a nut 7. The other end portion of the piston rod 6 extends through the cylinder upper chamber 2a and further through a rod guide 8 and a seal member 9, which are fitted to the upper end portion of the double-cylinder structure comprising the cylinder 2 and the outer cylinder 3, and projects to the outside of the cylinder 2. A base valve 10 is provided in the lower end portion of the cylinder 2 to divide the cylinder lower chamber 2b and the reservoir 4 from each other. The cylinder 2 has a hydraulic fluid sealed therein, and the reservoir 4 has the hydraulic fluid sealed therein, together with a gas.

The piston 5 is provided with hydraulic fluid passages 11 and 12 for communication between the cylinder upper and lower chambers 2a and 2b. The hydraulic fluid passage 11 is provided with a check valve 13 that allows the hydraulic fluid to flow through the hydraulic fluid passage 11 in only one direction from the cylinder lower chamber 2b toward the cylinder upper chamber 2a. The hydraulic fluid passage 12 is provided with a relief valve 14 that opens when the pressure of the hydraulic fluid in the cylinder lower chamber 2b reaches a predetermined pressure to relieve the pressure to the cylinder upper chamber 2a. The base valve 10 is provided with hydraulic fluid passages 15 and 16 for communication between the cylinder lower chamber 2b and the reservoir 4. The hydraulic fluid passage 15 is provided with a check valve 17 that allows the hydraulic fluid to flow through the hydraulic fluid passage 15 in only one direction from the reservoir 4 toward the cylinder lower chamber 2b. The hydraulic fluid passage 16 is provided with a relief valve 18 that opens when the pressure of the hydraulic fluid in the cylinder lower chamber 2b reaches a predetermined pressure to relieve the pressure to the reservoir 4.

An approximately cylindrical passage member 19 is fitted over the outer periphery of the cylinder 2. Annular hydraulic fluid passages 20 and 21 are formed between the cylinder 2 and the passage member 19. The annular hydraulic fluid passage 20 communicates with the cylinder upper chamber 2a through a hydraulic fluid passage 22 provided in the side wall of the cylinder 2 near the upper end thereof The annular hydraulic fluid passage 21 communicates with the cylinder lower chamber 2b through a hydraulic fluid passage 23 provided in the side wall of the cylinder 2 near the lower end thereof. A damping force generating mechanism 24 is secured to a side surface portion of the outer cylinder 3. The damping force generating mechanism 24 has a casing 25. The casing 25 is provided with three connecting ports 26, 27 and 28 connected to the annular hydraulic fluid passages 20 and 21 and the reservoir 4 through connecting pipes 29, 30 and 31, respectively.

Figure 2:
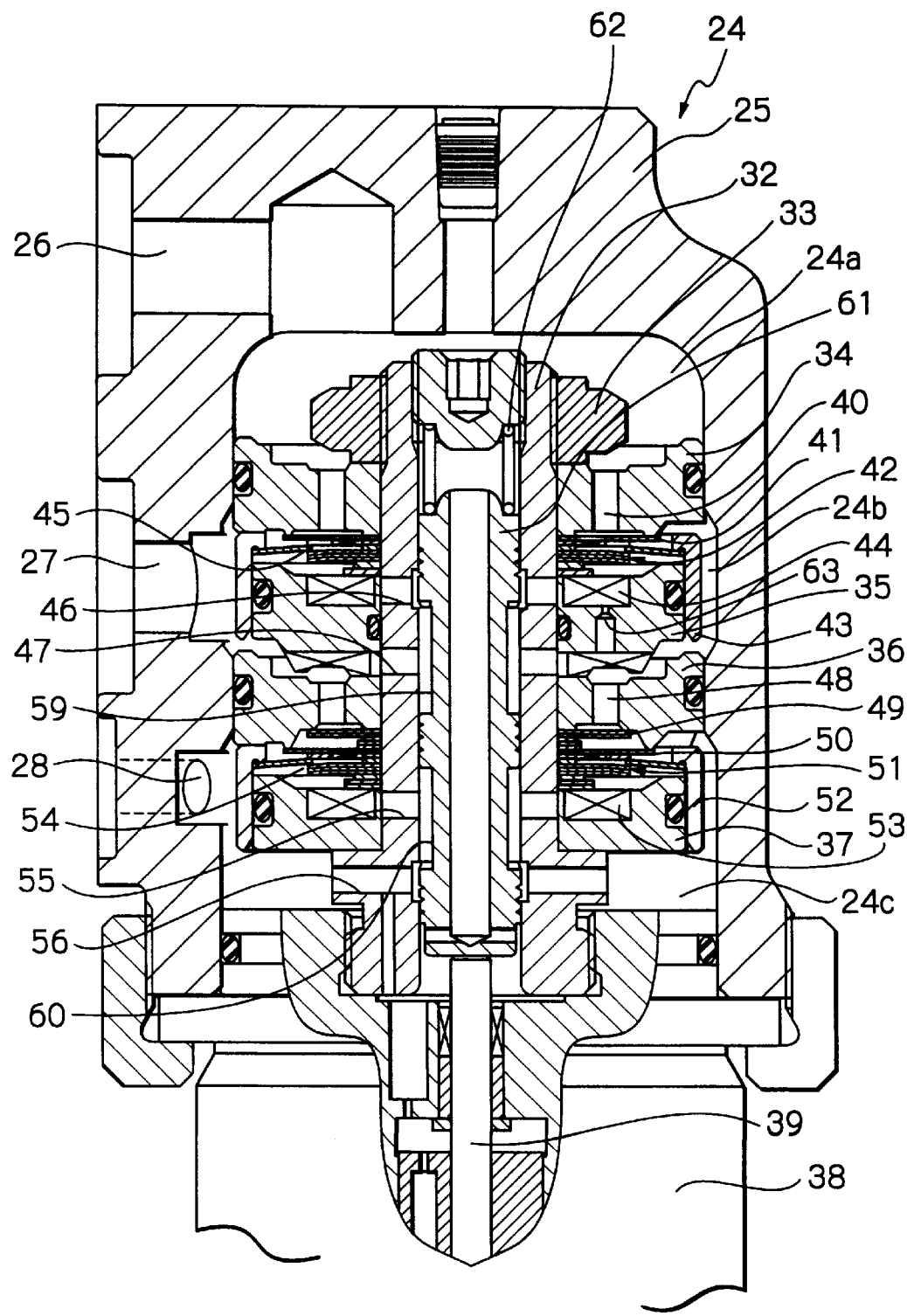
FIG. 2 is an enlarged view of a damping force generating mechanism in the apparatus shown in FIG. 1.

As shown in FIG. 2, the damping force generating mechanism 24 has an approximately cylindrical casing 25, one end of which is enclosed. Four valve bodies 34, 35, 36 and 37 are fitted in the casing 25. The valve bodies 34, 35, 36 and 37 are pierced with a sleeve 32 and united together by a nut 33. A proportional solenoid actuator 38 (hereinafter referred to as "actuator 38") is attached to the open end of the casing 25. The valve bodies 34 and 36 divide the inside of the casing 25 into three hydraulic fluid chambers 24a, 24b and 24c communicating with connecting ports 26, 27 and 28, respectively. The sleeve 32 is threadedly-engaged with the actuator 38. An operating rod 39 of the actuator 38 is inserted into the sleeve 32.

The valve body 34 is provided with a hydraulic fluid passage 40 for communication between the hydraulic fluid chambers 24a and 24b. The hydraulic fluid passage 40 is provided with a main valve 41 (disk valve). The main valve 41 is a pilot-type damping valve that opens upon receiving the pressure of the hydraulic fluid in the hydraulic fluid chamber 24a and generates damping force according to the degree of opening thereof A plurality of disk-shaped seal members 42 are stacked on the main valve 41. A pilot chamber 44 is formed at the back of the main valve 41 by the seal members 42, the valve body 35 and an annular seat member 43 fitted on the valve body 35. The pressure in the pilot chamber 44 acts in the direction for closing the main valve 41. The pilot chamber 44 communicates with the hydraulic fluid passage 40 through a fixed orifice 45 provided in the seal members 42. The pilot chamber 44 also communicates with a port 46 provided in the side wall of the sleeve 32. The sleeve 32 is provided with a port 47 at a position axially apart from the port 46. The port 47 communicates with the hydraulic fluid chamber 24b.

The valve body 36 is provided with a hydraulic fluid passage 48 for communication between the hydraulic fluid chambers 24b and 24c. The hydraulic fluid passage 48 is provided with a sub-valve 49 (upstream-side disk valve) and a main valve 50 (downstream-side disk valve). The sub-valve 49 and the main valve 50 are each adapted to open upon receiving the pressure of the hydraulic fluid in the hydraulic fluid chamber 24b and to generate damping force according to the degree of opening thereof. A plurality of disk-shaped seal members 51 are stacked on the main valve 50. A pilot chamber 53 is formed at the back of the main valve 50 by the seal members 51, the valve body 37 and an annular seat member 52 fitted on the valve body 37. The pressure in the pilot chamber 53 acts in the direction for closing the main valve 50. The pilot chamber 53 communicates with the hydraulic fluid passage 48 through a fixed orifice 54 provided in the seal members 51. The pilot chamber 53 also communicates with a port 55 provided in the side wall of the sleeve 32. The sleeve 32 is provided with a port 56 at a position axially apart from the port 55. The port 56 communicates with the hydraulic fluid chamber 24c. It should be noted that the valve opening pressure of the sub-valve 49 is set sufficiently lower than the valve opening pressure of the main valve 50.

A spool 61 is slidably fitted in the sleeve 32. The spool 61 has annular grooves 59 and 60. The annular groove 59 faces the ports 46 and 47. The annular groove 60 faces the ports 55 and 56. One end of the spool 61 abuts on a return spring 62, and the other end thereof abuts on the operating rod 39 of the actuator 38. The spool 61 moves in response to thrust from the actuator 38 against the spring force of the return spring 62 to control the flow path area determined by the ports 46 and 47 and also the flow path area determined by the ports 55 and 56. It should be noted that the ports 46 and 47 and the annular groove 59 constitute a variable orifice.

The valve body 35 is provided with an orifice passage 63 that provides communication between the pilot chamber 44 and the hydraulic fluid chamber 24b at all times. The flow path area of the orifice passage 63 is so set that when the flow path area determined by the ports 46 and 47 is made smallest by the spool 61, the flow rate of the hydraulic fluid flowing from the pilot chamber 44 to the hydraulic fluid chamber 24b can be sufficiently restricted, and thus desired "hard" damping force characteristics can be obtained during the extension stroke of the piston rod 6.

In the above-described arrangement, the hydraulic fluid passage 22, the annular hydraulic fluid passage 20, the connecting pipe 29, the connecting port 26, the hydraulic fluid chamber 24a, the hydraulic fluid passage 40, the hydraulic fluid chamber 24b, the connecting port 27, the connecting pipe 30, the annular hydraulic fluid passage 21 and the hydraulic fluid passage 23 constitute a main hydraulic fluid passage for connecting the cylinder upper and lower chambers 2a and 2b, and the fixed orifice 45, the pilot chamber 44, the port 46, the annular groove 59 and the port 47 constitute a sub-hydraulic fluid passage.

The operation of this embodiment will be described below.

During the extension stroke of the piston rod 6, as the piston 5 moves, the check valve 13 in the hydraulic fluid passage 11 of the piston 5 is closed, and the hydraulic fluid in the cylinder upper chamber 2a is pressurized. Consequently, before the main valve 41 opens, the hydraulic fluid in the cylinder upper chamber 2a flows through the hydraulic fluid passage 22, the annular hydraulic fluid passage 20 and the connecting pipe 29 to the connecting port 26 of the damping force generating mechanism 24 and further flows through the hydraulic fluid chamber 24a, the hydraulic fluid passage 40, the fixed orifice 45, the pilot chamber 44, the port 46, the annular groove 59, the port 47, the hydraulic fluid chamber 24b, the connecting port 27, the connecting pipe 30, the annular hydraulic fluid passage 21 and the hydraulic fluid passage 23 to the cylinder lower chamber 2b. It should be noted that a part of the hydraulic fluid flows into the hydraulic fluid chamber 24b from the pilot chamber 44 through the orifice passage 63 in parallel to the flow through the ports 46 and 47. When the pressure in the cylinder upper chamber 2a reaches the valve opening pressure of the main valve 41, the main valve 41 opens to allow the hydraulic fluid from the hydraulic fluid passage 40 to flow directly into the hydraulic fluid chamber 24b. At this time, an amount of hydraulic fluid corresponding to an amount by which the piston rod 6 withdraws from the cylinder 2 flows from the reservoir 4 to the cylinder lower chamber 2b by opening the check valve 17 in the hydraulic fluid passage 15 of the base valve 10.

Thus, during the extension stroke, when the piston speed is low and before the main valve 41 opens, damping force of orifice characteristics is generated according to the flow path area determined by the fixed orifice 45 and the ports 46 and 47 of the spool valve. As the piston speed increases, the pressure in the cylinder upper chamber 2a rises, and eventually the main valve 41 opens. After the main valve 41 has opened, damping force of valve characteristics is generated according to the degree of opening of the main valve 41. By moving the spool 61 with the actuator 38 to control the flow path area determined by the ports 46 and 47, the orifice characteristics are directly controlled. Moreover, the pressure in the pilot chamber 44 (the pressure acting in the direction for closing the main valve 41) is changed by the pressure loss between the ports 46 and 47. Thus, the valve characteristics can be controlled.

In this case, the pilot chamber 44 and the hydraulic fluid chamber 24b are always in communication with each other with a small flow path area through the orifice passage 63. Therefore, when the flow path area determined by the ports 46 and 47 is restricted close to a minimum, any variations in the flow path area due to variations in machining accuracy of the sleeve 32 and the spool 61 can be absorbed by the flow path area of the orifice passage 63. Accordingly, stable "hard" damping force characteristics can be obtained.

During the compression stroke of the piston rod 6, as the piston 5 moves, the check valve 13 of the piston 5 opens to allow the hydraulic fluid in the cylinder lower chamber 2b to flow directly into the cylinder upper chamber 2a through the hydraulic fluid passage 1. Consequently, the pressure in the cylinder upper chamber 2a and the pressure in the cylinder lower chamber 2b become approximately equal to each other. Therefore, there is no flow of hydraulic fluid between the connecting ports 26 and 27 of the damping force generating mechanism 24. Meanwhile, as the piston rod 6 enters the cylinder 2, the check valve 17 of the base valve 10 is closed, and the hydraulic fluid in the cylinder 2 is pressurized corresponding to an amount by which the piston rod 6 enters the cylinder 2. Before the main valve 50 opens, the hydraulic fluid in the cylinder lower chamber 2b flows through the hydraulic fluid passage 23, the annular hydraulic fluid passage 21 and the connecting pipe 30 to the connecting port 27 of the damping force generating mechanism 24. Further, the hydraulic fluid flows through the hydraulic fluid chamber 24b, the hydraulic fluid passage 48, the fixed orifice 54, the pilot chamber 53, the port 55, the annular groove 60, the port 56, the hydraulic fluid chamber 24c the connecting port 28 and the connecting pipe 31 to the reservoir 4. When the pressure in the cylinder lower chamber 2b reaches the valve opening pressure of the main valve 50, the main valve 50 opens to allow the hydraulic fluid from the hydraulic fluid passage 48 to flow directly into the hydraulic fluid chamber 24c.

Thus, during the compression stroke, when the piston speed is low and before the main valve 50 opens, damping force of orifice characteristics is generated according to the flow path area determined by the sub-valve 49, the fixed orifice 54 and the ports 55 and 56 of the spool valve. As the piston speed increases, the pressure in the cylinder lower chamber 2b rises, and eventually the main valve 50 opens. After the main valve 50 has opened, damping force of valve characteristics is generated according to the degree of opening of the main valve 50. By moving the spool 61 with the actuator 38 to control the flow path area determined by the ports 55 and 56, the orifice characteristics are directly controlled. Moreover, the pressure in the pilot chamber 53 (the pressure acting in the direction for closing the main valve 50) is changed by the pressure loss between the ports 55 and 56. Thus, the valve characteristics can be controlled.

Next, a second embodiment of the present invention will be described with reference to FIGS. 3 to 5. It should be noted that the second embodiment has almost the same arrangement as that of the first embodiment except for the structure of the orifice passage that constantly provides communication between the pilot chamber 44 and the hydraulic fluid chamber 24b in the damping force generating mechanism 24. Therefore, the same portions as those shown in FIGS. 1 and 2 are denoted by the same reference numerals, and only portions in which the second embodiment differs from the first embodiment will be described below in detail.

Figure 3:
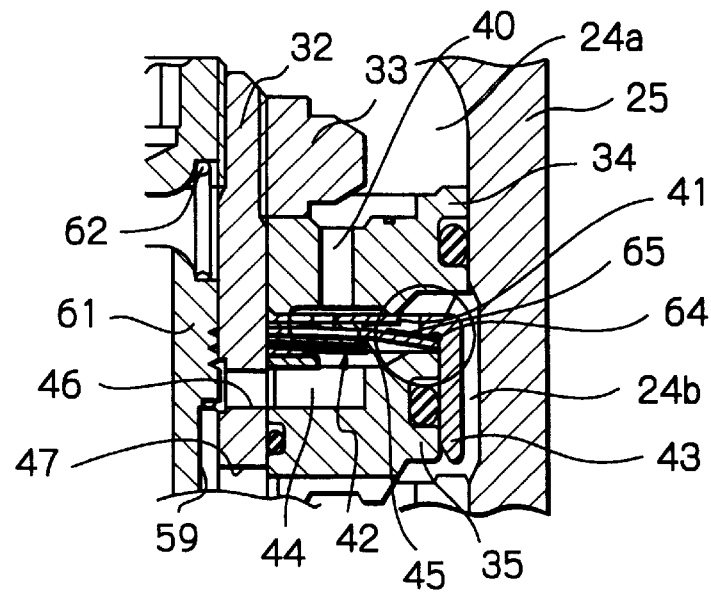
FIG. 3 is an enlarged view of an essential part of a damping force generating mechanism according to a second embodiment of the present invention.
Figure 4:
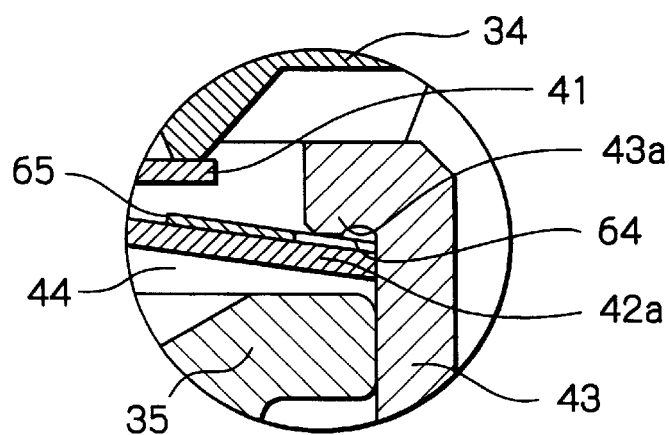
FIG. 4 is an enlarged view of a portion of the essential part shown in FIG. 3.
Figure 5:
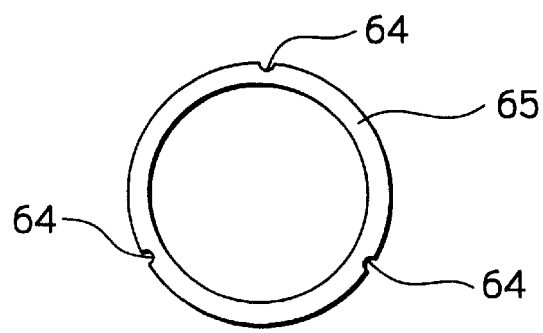
FIG. 5 is a front view of an orifice ring used in the damping force generating mechanism shown in FIG. 3.

As shown in FIGS. 3 and 4, in the second embodiment, the orifice passage 63 provided in the valve body 35 of the first embodiment is omitted, but instead an orifice ring 65 is interposed between a seal member 42a abutting against a seat portion 43a of the seat member 43 and the seat portion 43a. As shown in FIG. 5, the orifice ring 65 has a plurality of cut portions 64 in the outer peripheral portion thereof and is thinner than the seal member 42a. The cut portions 64 of the orifice ring 65 form an orifice passage that provides communication between the pilot chamber 44 and the hydraulic fluid chamber 24b at all times with a small flow path area. It should be noted that the orifice ring 65 is formed as a thin-walled ring in order to form a small flow path area and hence has low rigidity. Accordingly, the inner diameter of the orifice ring 65 is set larger than the inner diameter of the seal member 42a, thereby preventing deformation of the orifice ring 65 caused by deformation of the seal member 42a when the pressure in the pilot chamber 44 becomes high, and thus improving durability of the orifice ring 65.

It should be noted that although in FIG. 4 the outer periphery of the seal member 42a and the inner peripheral surface of the seat member 43 appear to be in contact with each other for the sake of illustration, there is actually a slight gap therebetween, and the hydraulic fluid flows through the gap.

Thus, the second embodiment, in which an orifice passage is formed by the cut portions 64 of the orifice ring 65, provides the same function and advantageous effects as those in the first embodiment.

Although in the foregoing embodiments an orifice passage is provided only for the extension-side damping valve, it should be noted that an orifice passage may also be provided for the compression-side damping valve. Although in the foregoing embodiments the present invention has been described with regard to a damping force control type hydraulic shock absorber having pilot-type damping valves for both the extension and contraction sides, it should be noted that the present invention is not necessarily limited thereto but may also be applied to a damping force control type hydraulic shock absorber having a pilot-type damping valve only for either the extension side or the compression side, or to a damping force control type hydraulic shock absorber having a pilot-type damping valve common to the extension and compression sides.

As has been detailed above, according to the damping force control type hydraulic shock absorber of the present invention, an orifice passage is provided in parallel to a variable orifice. Therefore, when the flow path area of the variable orifice is restricted, the flow rate of the hydraulic fluid flowing through the sub-hydraulic fluid passage is substantially determined by the orifice passage and hence unlikely to be affected by variations in flow path area of the variable orifice. Therefore, stable "hard" damping force characteristics can be obtained.

What is claimed is:

1. A damping force control type hydraulic shock absorber comprising:
   a cylinder having a hydraulic fluid sealed therein;
   a piston slidably fitted in said cylinder to divide the interior of the cylinder into two cylinder chambers;
   a piston rod connected at one end thereof to said piston, the other end of said piston rod extending outside of said cylinder; and
   a damping force generating mechanism including:
      a main hydraulic fluid passage for passing the hydraulic fluid in response to sliding movement of said piston,
      a sub-hydraulic fluid passage provided in parallel to said main hydraulic fluid passage,
      a pilot-type damping valve provided in said main hydraulic fluid passage,
      a fixed orifice and variable orifice provided in said sub-hydraulic fluid passage, wherein a pressure between said fixed orifice and said variable orifice in said sub-hydraulic fluid passage is used as a pilot pressure of said pilot-type damping valve, and
      an orifice passage provided in parallel to said variable orifice so as to relieve said pilot pressure.

2. A damping force control type hydraulic shock absorber according to claim 1, wherein said damping force generating mechanism further includes:
   a casing provided outside said cylinder;
   a sleeve fixed in said casing;
   a valve body of a generally cup shape and fixed to said sleeve;
   a valve structure including a disk valve used as said pilot-type damping valve, said valve structure closing an open end of said cup shaped valve body to form a pilot chamber in said valve body and defining a first hydraulic fluid chamber connected to one of said cylinder chambers and a second hydraulic fluid chamber connected to the other of said cylinder chambers, said disk valve being situated such that when it opens, the hydraulic fluid flows from said first hydraulic fluid chamber to said second hydraulic fluid chamber;
   a port formed in said sleeve to communicate with said pilot chamber; and
   a solenoid-operated spool in said sleeve having a valve portion through which said port is communicated with said second hydraulic fluid chamber, said valve portion being operable to control the flow-path area of said port,
   wherein said fixed orifice is provided in said valve structure and said orifice passage is formed in said valve body so as to communicate said pilot chamber with said second hydraulic chamber.

3. A damping force control type hydraulic shock absorber according to claim 2, wherein said orifice passage is provided in a bottom portion of said valve body.

4. A damping force control type hydraulic shock absorber according to claim 1, wherein said damping force generating mechanism further includes:
   a casing provided outside said cylinder;
   a sleeve fixed in said casing;
   a valve body of a generally cup shape and fixed to said sleeve;
   a valve structure including a disk valve used as said pilot-type damping valve, said valve structure closing an open end of said cup shaped valve body to form a pilot chamber in said valve body and defining a first hydraulic fluid chamber connected to one of said cylinder chambers and a second hydraulic fluid chamber connected to the other of said cylinder chambers, said disk valve being situated such that when it opens, the hydraulic fluid flows from said first hydraulic fluid chamber to said second hydraulic fluid chamber;
   a port formed in said sleeve to communicate with said pilot chamber; and
   a solenoid-operated spool in said sleeve having a valve portion through which said port is communicated with said second hydraulic fluid chamber, said valve portion being operable to control the flow-path area of said port,
   an annular seat member slidably fit on the outer peripheral wall of said valve body and having an inwardly extending flange having a seat portion, said valve structure having a seal member biased to both said disk valve and said seat portion of the seat member, wherein said fixed orifice is provided in said valve structure and said orifice passage is formed between said seal member and said seat portion of the seat member.

5. A damping force control type hydraulic shock absorber according to claim 4, further comprising an orifice ring situated between said seal member and said seat portion of the seat member, said orifice ring having at least one notch at the outer peripheral portion thereof.

6. A damping force control type hydraulic shock absorber comprising:

a cylinder having a hydraulic fluid sealed therein;

a piston slidably fitted in said cylinder to divide the interior of the cylinder into two cylinder chambers;

a piston rod connected at one end thereof to said piston, the other end of said piston rod extending to an outside of said cylinder; and a damping force generating mechanism including:

a main hydraulic fluid passage for passing the hydraulic fluid in response to sliding movement of said piston, said main hydraulic fluid passage comprises at least one hydraulic fluid chamber, a sub-hydraulic fluid passage provided in parallel to said main hydraulic fluid passage, said sub-hydraulic fluid passage comprising a pilot chamber, a variable orifice, and a fixed orifice, wherein said variable orifice and fixed orifice are in communication with said hydraulic fluid chamber, a pilot-type damping valve provided in said main hydraulic fluid passage, wherein a pressure in said pilot chamber developed by a pressure loss between said variable orifice and fixed orifice is used as a pilot pressure of said pilot-type damping valve, and an orifice passage located between said hydraulic fluid chamber and said pilot chamber in order to provide continuous communication between said hydraulic fluid chamber and said pilot chamber, said orifice passage being provided in parallel to said variable orifice so as to relieve the pilot pressure.

* * * * *